Figure 1:
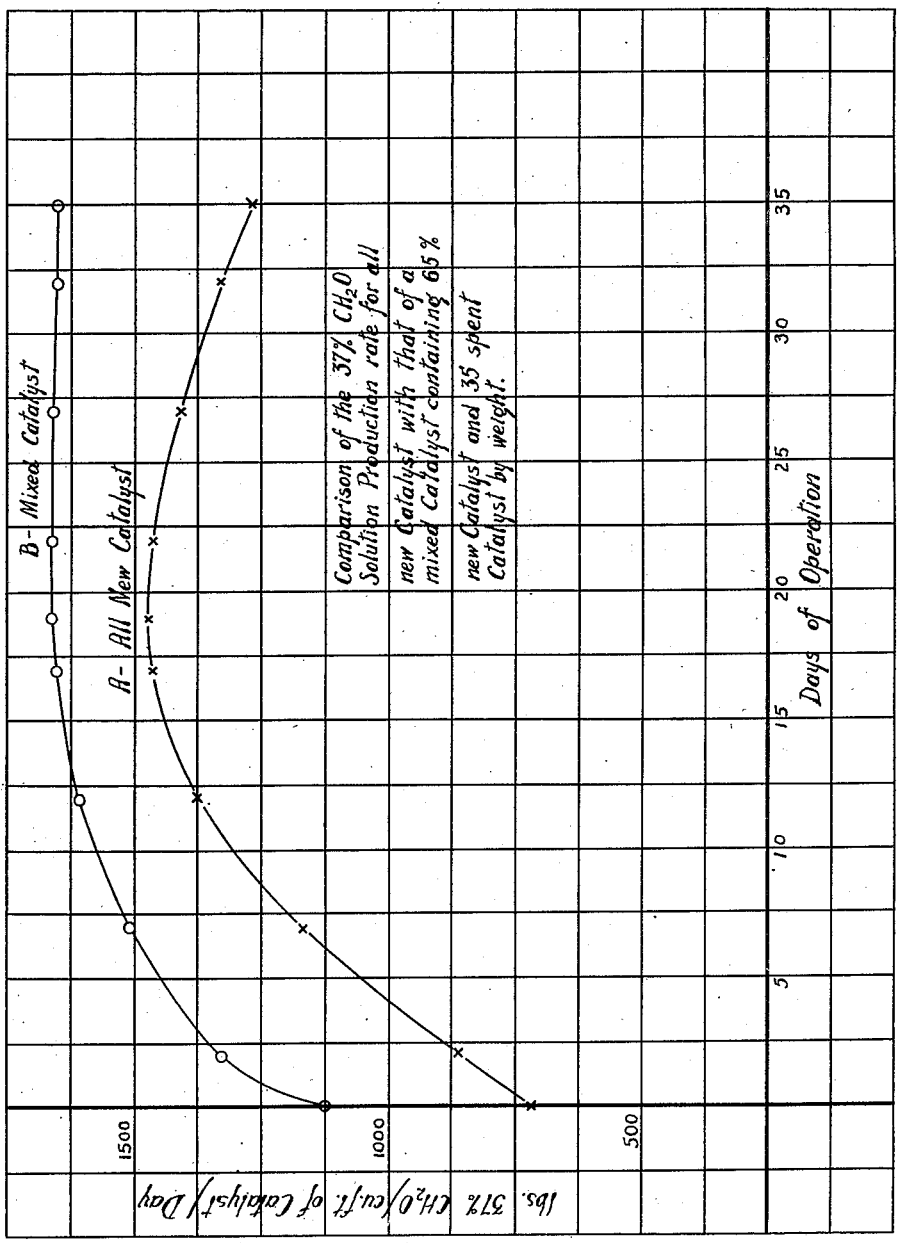

Nov. 5, 1957 R. B. WALKER ET AL 2,812,310
PROCESS AND CATALYST FOR OXIDATION OF METHANOL TO FORMALDEHYDE
Filed Oct. 11, 1954 2 Sheets-Sheet 1

Fig. I.

INVENTORS
Robert B. Walker
Harold O. Warner
Theodore S. Hodgins
BY
ATTORNEY

United States Patent Office 2,812,310
Patented Nov. 5, 1957

2,812,310

PROCESS AND CATALYST FOR OXIDATION OF METHANOL TO FORMALDEHYDE

Robert Bruce Walker, Seattle, Harold O. Warner, Mercer Island, and Theodore S. Hodgins, Seattle, Wash., assignors to Reichhold Chemicals, Inc., Detroit, Mich.

Application October 11, 1954, Serial No. 461,372

4 Claims. (Cl. 252—470)

The invention relates to an unsupported catalyst containing molybdenum and iron oxides which is useful in the oxidation of methanol to formaldehyde. In copending application Serial No. 452,684, filed August 27, 1954, the entire disclosure of which is hereby incorporated by reference, there is described a method of preparation of a molybdenum oxide-iron oxide catalyst precursor which contains $MoO_3$ and $Fe_2O_3$ in the molar ratio of between 3.6 and 11.1, between 5 to 30% water, and 0.0 to 7.5% ammonia. This catalyst precursor is converted into active catalyst by loading the precursor into the converter tubes of a methanol converter to a suitable depth and simultaneously removing substantially all water and ammonia from the catalyst precursor in place by a carefully controlled heating and dehydration cycle, before any methanol is contacted with the catalyst. Our invention relates to an improvement in the active catalyst disclosed in this copending application, which improvement has to do with rejuvenation of catalyst which has passed its peak of productivity. As set forth in the aforesaid application Serial No. 452,684, the catalyst precursor may be prepared by reacting a water soluble iron salt with a water soluble molybdate salt under certain carefully controlled conditions. Any soluble iron salt may be used except those iron salts whose anions form strong complexes with iron in solution. Salts such as ferric chloride, ferric bromide, ferric acetate, ferric sulfate, ferrous chloride, ferrous acetate and the like may be used. Water soluble salts made from iron and organic acids may be used as well as salts from inorganic acids.

Any soluble molybdate salt such as ammonium molybdate, potassium or sodium molybdate or the like may be used. Molybdate salts of organic amines that are water soluble are suitable. It is only desirable that the salt produced along with the iron molybdate in a double decomposition be soluble, so that it may be washed away from the precipitated iron molybdate with ease.

The presence of certain metallic elements in trace amounts does no harm to the overall working of the catalyst. Elements which have been found non-harmful in trace amounts in our finished catalyst precursor are aluminum, calcium, chromium, cobalt, magnesium, nickel, and silicon. By trace amounts we mean less than about 0.001% by weight. These elements are not necessary for the activity of our catalyst since we have prepared catalyst precursors of satisfactory properties from carefully purified iron and molybdate raw materials. In the use of the active catalyst described in the aforesaid copending application we have found that there is a critical feed ratio which may be used at the startup when methanol is first fed to the converter. If a higher feed ratio is used the freshly activated catalyst being extremely active, causes the oxidation to proceed with such rapidity that an explosion results. It has been the practice in operating a formaldehyde producing plant using the molybdenum oxide-iron catalyst of application Serial No. 452,684 for the plant operator to critically observe the temperature of the hot spot in the catalyst bed. This is accomplished by traversing the height of the catalyst bed with a movable thermocouple. In actual practice the temperature is measured on the inside of the steel tube containing the active catalyst and the reacting gases by means of a thermowell in the tube. Any sudden rise in the hot spot temperature is an indication that the reaction is becoming too vigorous and if the feed ratio is not lowered and/or simultaneously the operating conditions changed to remove more heat from the converter, an explosion will result. It is, of course, economically desirable to operate the formaldehyde producing plant at the highest possible feed rate consistent with safe non-explosive operation, since by so doing more formaldehyde is produced per unit of invested capital. To achieve this more economical production it is customary to gradually increase the feed ratio. We have found that as the active catalyst ages while on stream producing formaldehyde the catalyst becomes less sensitive to feed ratio and a higher temperature may be effectively employed in the heat extracting fluid medium surrounding the catalyst tubes and the critical hot spot temperature above which explosions occur is also increased. We do not know precisely what is the nature of the physical change in the catalyst which causes the reduction in sensitivity of the freshly activated catalyst. While we do not wish to be limited by the following explanation we believe that the decrease in sensitivity is due to a partial fusion of the more active centers of catalysis. These more reactive centers are the more dispersed aerogel particles of catalyst as well as the finely divided particles of more dense catalyst. As the catalyst ages while on stream producing formaldehye by the oxidation of methanol with air, there is an increase in the amount of the small particle sizes. This increase in small mesh size material (i. e. that below 10 mesh and preferably below 20 mesh) causes a proportionate decrease in the space velocity at constant pressure drop across the converter. Eventually this plugging of the catalyst tubes reaches a state where it is no longer economic to operate the converter since the daily production rate is too low. When this stage of plugging is reached the spent catalyst has heretofore been discarded as no longer suitable for methanol conversion. We have now found that this spent catalyst may be reused when screened free of fine particles or screened and combined in part with fresh catalyst precursor and subsequently reactivated.

The following is a description of the preferred procedure used to produce a molybdenum oxide-iron oxide catalyst precursor. This catalyst precursor when properly heat treated and air blown gives a satisfactory active catalyst. After the active catalyst has been on stream for some days producing formaldehyde by the air oxidation of methanol it passes a peak in the rate of formaldehyde produced per unit volume of catalyst. The catalyst which is beyond its peak performance is what we refer to as spent catalyst.

On iron oxide molybdenum oxide catalyst precursor was prepared in glass lined and porcelain equipment as follows:

(1) 25 pounds, 2 ounces of C. P. grade ferric chloride ($FeCl_3.6H_2O$) were dissolved in 150 gallons of water initially at 70° F. The pH of the resulting solution was about 1.7.

(2) In a separate vessel 56 pounds, 6 ounces of C. P. grade ammonium heptamolybdate $$((NH_4)_6Mo_7O_{24}.4H_2O)$$

were dissolved in 100 gallons of water initially at 125° F. The pH of the resulting solution was approximately 5.3. This pH was adjusted to 2.25 using about 12 pounds of C. P. hydrochloric acid (12 normal).

(3) The ammonium molybdate solution was then added slowly with efficient rapid agitation to the ferric chloride solution, the total elapsed time being about 1 hour.

(4) The resulting greenish yellow precipitate was allowed to settle about 6 hours and the supernatant liquid siphoned off. The settled precipitate was then washed with cold water in two separate portions of about 20 gallons apiece, the precipitate being allowed to settle for four hours after each wash before siphoning off the wash water.

(5) The resulting slurry was then vacuum filtered to a cake thickness of 1.5 inches.

(6) Upon removal from the filter the cakes were placed on ventilated racks and air dried for five days at room temperature.

(7) Further drying consisted of the following:

(a) 48 hours at 175° F.
(b) 72 hours at 225° F.
(c) Filter cakes turned over and broken up into chunks 1 mesh or less size, then dried for 24 hours at 300° F.

(8) The dried catalyst precursor was then comminuted to −8+20 mesh.

(9) This catalyst precursor was loaded into a converter consisting of a series of one inch O. D. 13 gauge boiler tubes operating in parallel. The catalyst tubes were surrounded by a heat transfer medium to permit the heat treatment of the catalyst. The catalyst precursor was poured into the tubes without any tamping to a depth of 23 inches. The heat transfer medium was then gradually warmed up from room temperature to approximately 200° F. and air was gently blown through at a space velocity of 25 per minute. The temperature of the heat transfer medium was then raised slowly over a period of 3 hours from 200° to 500° F. and held at that temperature until no further trace of water or ammonia was detected in the exhaust gas.

The catalyst precursor has then been made into active catalyst possessing suitable physical properties to permit the long efficient production of formaldehyde.

The operation of this active catalyst continued for 23 days gradually increasing in ability to handle high methanol air feed ratios. On the 23rd day a production rate of 1,470 pounds of 37% formaldehyde solution per cubic foot of catalyst per day was reached. After 30 days of operation, at which time the production rate had decreased to about 1,300 pounds of 37% formaldehyde solution per cubic foot of catalyst per day, the converter was shut down and the spent catalyst cooled off and removed from the catalyst tubes. This spent catalyst was characterized by a light slightly greenish gray color. The spent catalyst was screened on a screen having a mesh of 4 to the inch and the material larger than 4 mesh discarded. The spent catalyst passing through the 4 mesh screen was screened on a 20 mesh screen and the spent catalyst remaining on the 20 mesh screen was then ready to be mixed with fresh catalyst precursor.

A mixture of 35% by weight of this sized spent catalyst with 65% of fresh catalyst precursor was prepared. This mixture was charged into the catalyst tubes as hereinbefore described and activated in similar fashion to a charge of 100% catalyst precursor. The active catalyst so prepared was then used to produce formaldehyde by the air oxidation of methanol. It was found that a permissible production rate of 1125 pounds of 37% formaldehyde solution per cubic foot of catalyst per day was obtained immediately after activation and after 19 days of operation a plateau was reached of 1,660 pounds of 37% formaldehyde solution per cubic foot of catalyst per day was reached and continued beyond the 35th day of operation.

Apparently in spite of careful control there is considerable variation in the physical strength of individual catalyst particles. Some of these particles are more readily crushed in the handling and by erosion by impinging gases in the catalyst bed than are other more durable catalyst particles. About 30% of the original catalyst charge is lost by conversion into catalyst fines during the normal operation of 7 weeks before catalyst renewal is necessary.

We have found that if spent catalyst is screened to remove all particles having a mesh size finer than 20 mesh and preferably finer than 10 mesh and larger than 4 mesh its activity is partially renewed and an overall plant yield may be obtained almost equivalent to fresh catalyst. However, the greatest advantage occurs from combining resized spent catalyst with fresh catalyst precursor. The spent catalyst being completely anhydrous has a beneficial effect of shortening the activation time in the conversion of catalyst precursor to active catalyst. The process of use of the active catalyst followed by the resizing operation selectively removes those catalyst particles which are physically the weakest or softest. The sized spent catalyst, because of its relatively greater strength, is ideal for mixing with new catalyst precursor since after activation of the catalyst precursor the rate of loss in space velocity is less than for completely fresh converted catalyst precursor. We have found that up to 50% by weight of the unsupported catalyst may be spent catalyst. We have found that it is possible to use higher methanol feed ratios than can be used with 100% fresh active catalyst, thereby increasing the overall plant capacity without costly additions of capital equipment.

The catalyst precursor has a light yellow-green or chartreuse color. Spent catalyst is predominantly gray colored with some slight yellow-green overcast. The difference in color is very noticeable and it is easy to distinguish between a blend of spent catalyst with catalyst precursor and straight catalyst precursor.

Figure 2:
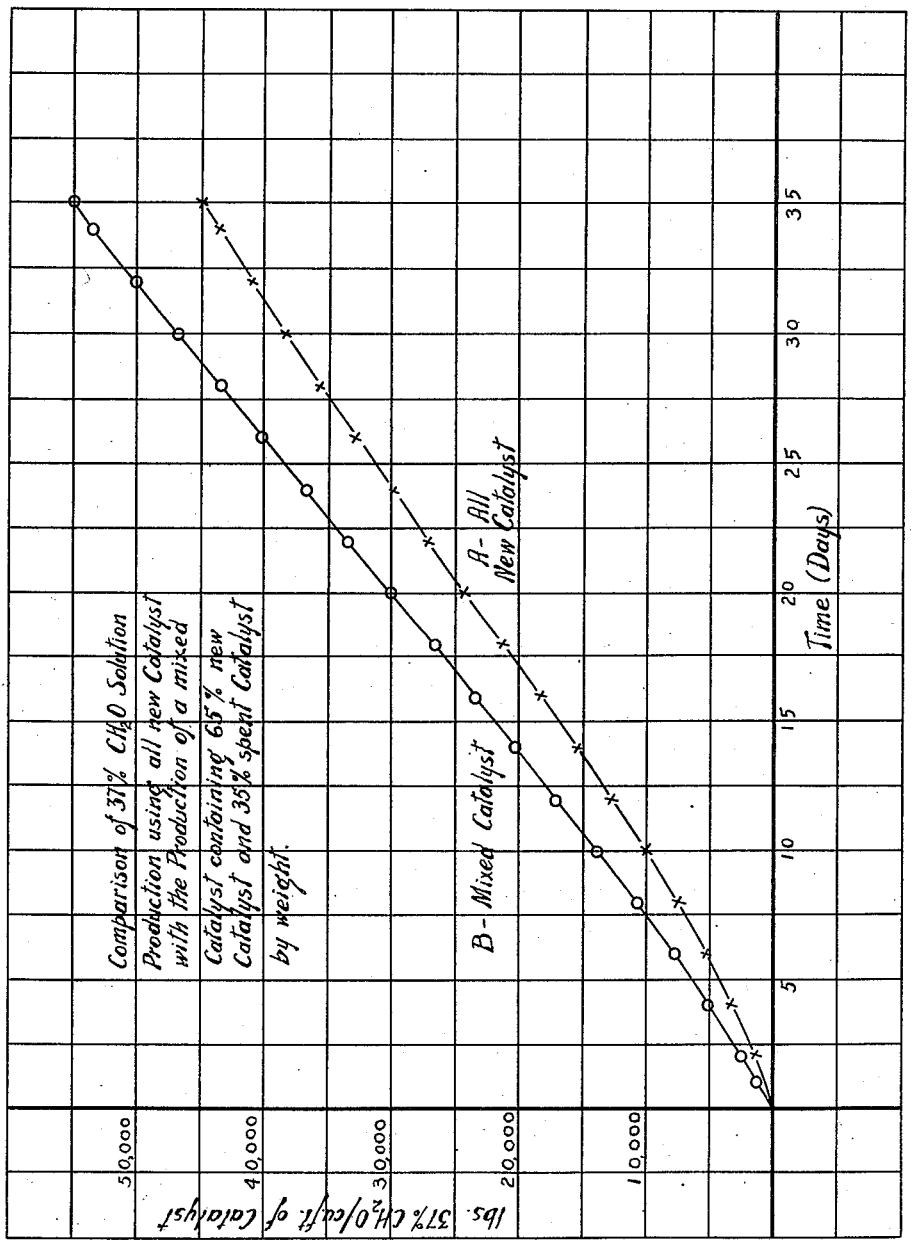

In Fig. 1 are shown two curves. One of these curves, A, shows yield data from the operation of a methanol converter during the startup period and beyond the maximum production rate period for 100% fresh catalyst. This is to be contrasted with curve B which represents the yield of the same converter under the same conditions as curve A but using a catalyst mixture of 35% spent catalyst and 65% fresh catalyst precursor. The curves in Fig. 2 show the cumulative production of formaldehyde expressed as pounds of 37% formaldehyde solution per cubic foot of catalyst versus the days of operation. It is to be noted that the use of properly activated catalyst blend of spent catalyst and fresh catalyst precursor enables a given plant to produce substantially more product formaldehyde than when a properly activated catalyst made from fresh catalyst precursor of the same chemical composition is used. These curves show that after about 23 days of operation the daily rate of production with 100% fresh catalyst has passed a peak and is declining, whereas the daily rate of production with 65% catalyst reaches a maximum at about the same time. This daily rate does not decline even up to 35 days of operation. When we refer to spent catalyst we mean catalyst made from catalyst precursor properly activated and used for formaldehyde production beyond its maximum activity as shown on the daily production rate curve. This effect of the combination of spent catalyst with catalyst precursor and the proper activation of the blend to give a superior catalyst we believe to be new and novel and is what we desire to protect by Letters Patent.

We claim:

1. A process for the preparation of a methanol to formaldehyde conversion catalyst consisting of the steps of sizing to remove all particles larger than 4 mesh and smaller than 20 mesh to the inch from spent molybdenum oxide-iron oxide catalyst which contains $MoO_3$ and $Fe_2O_3$ in the mole ratio between 3.6 and 11.1 and containing substantially no water or ammonia and combining not less than 30% nor more than 50% by weight with fresh molybdenum oxide-iron oxide catalyst precursor which contains MoO₃ and Fe₂O₃ in the mole ratio between 3.6 and 11.1 and heat treating and air blowing while contained within a methanol converter until activated prior to the introduction of methanol.

2. A process as set forth in claim 1, wherein the catalyst precursor is formed by reacting ferric chloride and ammonium heptamolybdate to form a greenish yellow precipitate, and partially drying the precipitate.

3. A process as set forth in claim 1, wherein the mixture of spent catalyst and catalyst precursor is heated to 200° F. in the converter in the presence of moving air.

4. A process as set forth in claim 1, wherein the mixture of spent catalyst and catalyst precursor is heated up to 200° F. in the converter in the presence of moving air, then raising the temperature from 200 to 500° F. over a period of three hours, and continuing heating at that temperature until no further traces of water or ammonia are detected in the exhaust gas.

References Cited in the file of this patent

UNITED STATES PATENTS

| | | |
|---|---|---|
| 1,913,405 | Meharg | June 13, 1933 |
| 2,345,487 | Liedholm | Mar. 28, 1944 |
| 2,369,432 | Byrns | Feb. 13, 1945 |
| 2,584,531 | Arnold et al. | Feb. 5, 1952 |